March 30, 1965
O. DITTRICH ETAL
3,175,410
INFINITELY VARIABLE CONE PULLEY GEAR WITH
TOOTHED CONICAL PULLEY DISKS
Filed Dec. 18, 1962
2 Sheets—Sheet 1
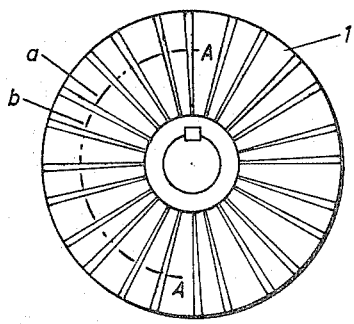
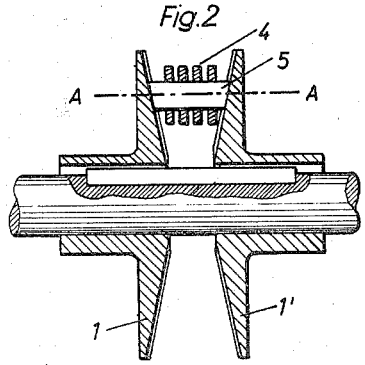
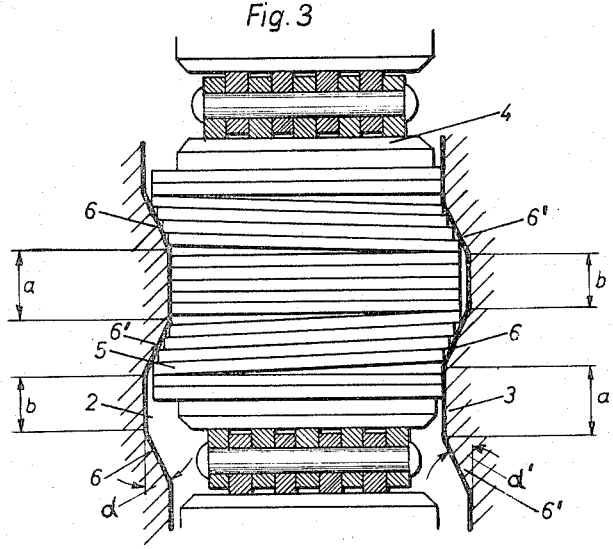
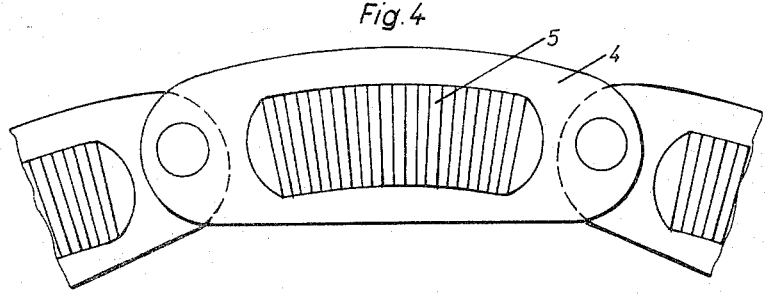
INVENTORS
Otto Dittrich
Werner Gesche
BY
Bailey, Stephens & Huettig
ATTORNEYS March 30, 1965  O. DITTRICH ETAL  3,175,410
INFINITELY VARIABLE CONE PULLEY GEAR WITH
TOOTHED CONICAL PULLEY DISKS
Filed Dec. 18, 1962  2 Sheets-Sheet 2

INVENTORS
OTTO DITTRICH
WERNER GESCHE

BY *Bailey, Stephens & Huettig*

ATTORNEYS.

3,175,410
INFINITELY VARIABLE CONE PULLEY GEAR WITH TOOTHED CONICAL PULLEY DISKS

Otto Dittrich and Werner Gesche, Bad Homburg vor der Hohe, Germany, assignors to Reimers Getriebe K.G., Ascona, Switzerland, a firm of Switzerland
Filed Dec. 18, 1962, Ser. No. 245,461
Claims priority, application Germany, Dec. 30, 1961, R 31,790
6 Claims. (Cl. 74—230.17)

The present invention relates to an infinitely variable cone pulley transmission which is provided with toothed conical pulley disks, the teeth of which have a trapezoidal cross section and in which each tooth of one disk of a pair forming one pulley is disposed directly opposite to a tooth space of the other disk of this pair as seen in the axial direction of both disks and which operates by means of a link chain, the individual links of which are provided with a plurality of segments which are slidable transversely to the direction of travel of the chain for the purpose of automatically forming teeth of a changing width and pitch which are adapted to engage with the toothed conical disks. Such segmental chain gears with toothed conical disks are known for many years and large numbers of them are still being manufactured and used since the cost of their production is relatively low and their accuracy of transmission is very high.

The formation of such teeth reults in a positive transmission of power between the segmental chain and the toothed conical pulley disks, provided that the flanks of the opposite teeth and tooth spaces are inclined at an angle of 90° and thus coincide with the radial plane extending through the axis of the disks.

In order to facilitate the formation of the teeth on the chain during its engagement with the conical disks, the flank angle of the teeth on these disks is generally made smaller than the ideal size of 90°, and mostly only 60°, but never less than 50°, and in accordance with the thickness of the material of the segments the width of the bottom of each tooth space is made greater than the width of the tooth face.

These positive-transmission transmissions have, however, the fundamental disadvantage that, because of the large difference between the elastic action of the conical disks and the chain and the rigidity of the positive engagement between the teeth formed by the segments and the teeth of the conical disks, only very few of these "segmental teeth" participate in the transmission of forces within the arc of contact of the chain with the disks. Those segmental teeth which are bearing the forces are therefore subjected to relatively high loads which reduce the length of service of the transmission as well as the power which may be transmitted thereby. The concentration of forces upon small areas also results in the development of considerable heat and a loud noise of the transmission which, in turn, limit the speed at which such a gear may be operated.

What has been said above also applies to positive transmission gears which likewise operate with toothed conical disks, but in which the tooth spaces of the disks of each pair are of a triangular cross section and are disposed directly opposite to each other in the axial direction. In gears of this type there are no sets of segments employed for the purpose of forming the teeth which engage into the tooth spaces of the conical disks, but pressure members with roof-shaped contact teeth of a triangular cross section which are slidable to a limited extent in the axial direction within the individual chain links and under the action of the wedging forces compress the pressure members within the chain links so strongly that the peripheral force is transmitted by friction from the pins carrying the roof-shaped contact members to the driving strand of the chain. Theoretically, the forces are transmitted also in such a transmission only by one tooth at a time, although in actual practice the peripheral force is also in this case distributed to a few teeth. However, in such a transmission it is also absolutely impossible to attain even a somewhat uniform distribution of the load to all teeth within the arc of contact of the chain with the two disks of each pulley. Inasmuch as transmissions of this type are considerably more expensive than those of the type previously mentioned, especially insofar as the chains are concerned, they have so far not attained any acclaim in actual practice.

The ideal case that all chain links which are in engagement with the pulley disks participate in the transmission of forces has so far been realized only in cone pulley transmissions which operate purely by frictional transmission. The principal advantages of these transmissions are that, due to the distribution of forces to all of the chain links which are located at the same time within the arc of contact with the pulley disks, each individual link is subjected to very low specific stresses, that they operate with very little noise, and that they can operate with higher torques and higher speeds, that is, with a greater specific output as compared with the expense of their manufacture. However, all of these purely frictional transmissions and especially those which consist entirely of metal have the disadvantage that, because of the relatively low friction at the point of power transmission, an extremely strong contact pressure is required between the chain and the smooth conical disks in order to transmit the forces by friction, and that, if a slipping of the chain and also an unnecessary high load upon the elements of the transmission is to be avoided, this contact pressure must be made of a strength which depends upon the torque to be transmitted as well as upon the particular speed ratio to which the transmission is adjusted. Although this has been attained by many different means, such transmissions are always of a rather complicated construction and therefore expensive. Furthermore, they require high-grade materials and must be made of the highest degree of accuracy.

It is an object of the present invention to provide an infinitely variable transmission with conical pulley disks which combines the advantages of a transmission of the type in which the forces are transmitted by friction between the chain and the pulley disks with the advantages of a transmission of the type in which the forces are transmitted by a positive engagement between the chain and the pulley disks, and which overcomes as much as possible the disadvantages of both of these transmission types.

More particularly, it is an object of the invention to provide a cone pulley transmission which operates more quietly than the known positive-transmission transmissions which are provided with segmental transmission chains and permits at no higher expense than these known transmissions the transmission of higher torques and to run at higher speeds, and which thus has a higher specific power output than these known transmissions without, however, relinquishing the advantages of a positive power transmission in favor of a purely frictional transmission.

For attaining the above-mentioned objects, the invention proceeds from an infinitely variable cone pulley transmission of the type which is provided with toothed conical pulley disks, the teeth of which have a trapezoidal cross section and which each tooth of one conical disk of each pair forming a pulley is located directly opposite to a tooth space of the other conical disk of the same pair, as seen in the axial direction of both disks, and in which the power is transmitted by a link chain, each link of which is provided with a plurality of segments which are slidable transversely to the direction of travel of the chain and are adapted when entering between the two conical disks of one pulley automatically to form teeth of a varying width and pitch in accordance with the varying arc of contact between the chain and the two disks of each pulley. The objects of the invention are attained primarily by designing the teeth of the conical disks so that the flanks thereof are disposed relative to the surface of the conical disks at angles smaller than 50° and preferably amounting to only 20° to 45°.

The invention combination therefore consists in employing toothed conical pulley disks which are provided with teeth and tooth spaces of a trapezoidal cross section, in making the flanks of these teeth of a considerably smaller inclination than those of the teeth of the conical disks of previous positive-transmission transmission, and in employing a segmental link chain of a known type as the power transmitting element. This new combination results in the very remarkable characteristic that the power transmission of such a cone pulley transmission is no longer purely positive but only partly positive and partly frictional. How this occurs may be seen by the following observations:

The tooth which is formed by the segments of the link of the chain which just enter between the two disks of the driving pulley no longer remains unchanged while passing along the arc of contact with the disks, as this occurs in a regular positive-transmission transmission, but it shifts within its set of segments for a small distance in the direction opposite to the direction of travel of the chain. In other words, the chain carries out a small creeping movement relative to the disks by slightly lagging between the driving pair of disks and by slightly leading between the driven pair of disks.

The chain does this necessarily also in transmissions with a purely frictional power transmission since without any creeping movement there is no possibility of any frictional transmission. Even in positive drives, a slight elastic deformation necessarily occurs between the interengaging parts, but this elastic deformation is caused by the transfer of the load from the particular loaded segmental tooth of the adjacent unloaded segmental tooth. Insofar as the driven pair of conical pulley disks is concerned, this occurs when the power-transmitting segmental tooth leaves the conical disks and transfers the load to the following segmental tooth.

The above observations show that it is possible, on the one hand, to utilize the advantages of a purely frictional power transmission with an approximately uniform load upon all chain links which are located within the arc of contact with the conical disks and, on the other hand, to retain to a very considerable extent the advantages of a positive power transmission.

As compared with a cone pulley transmission with smooth conical disks, the disks with teeth with small flank angles have the advantage that the creeping movement of the chain is very small since there are several points of frictional engagement in series, namely, the friction of the segments on the surfaces of the tooth faces and on the bottom surfaces of the tooth spaces, the friction of the segments on the inclined surfaces of the teeth, and the friction of the flat surfaces of the segments on each other. The sum of these frictional values very highly exceeds the frictional value of a simple frictional chain drive.

In order to attain a positive power transmission despite the small angles of the tooth flanks, a novel effect is employed which, in turn, is attainable only by means of these smaller flank angles. While the bottom surface of each tooth space of a conical disk with steep flank angles larger than 50° must be wider than the face of the tooth since otherwise, because of the acute angle between the flanks, the segments might be squeezed or upset, it is possible to design the opposite teeth and tooth spaces which are provided with flank angles as prescribed by the invention in such a manner that the segments will be strongly pressed against each other with their flat sides and will thus be clamped to each other. As the result of this, the teeth which are formed by each set of segments retain their shape to such an extent that there is practically a positive connection between the conical disks and the chain. The sets of segments may accordingly to the invention be provided with teeth of a more or less stable shape by making the faces of the teeth of the conical disks of a larger size than the bottom surfaces of the tooth spaces. In an extreme case, the bottom surface of each tooth space may be reduced to zero, if the face of the tooth is made of a small width. A designer will thus be able to design the teeth of the conical disks so as to attain the most suitable coordination between the above-mentioned frictional and clamping effects. He will thus attain a chain transmission which is equivalent to a positive-transmission transmission, but avoids the disadvantages of the latter and is therefore capable of carrying a greater specific load, although the required contact pressure of the conical disks against the chain and the tension of the latter may be made relatively low. It is therefore also possible to make the means for producing this contact pressure of a simple and inexpensive construction.

The distribution of the power transmission to all chain links which are in engagement with the conical disks within the arc of contact and the reduction of the axial forces between the chain and the disks therefore permit the construction of relatively simple and sturdy transmissions of a high specific power output which possess all the advantageous features of a positive power transmission and also the greatest possible degree of accuracy in maintaining the particular speed ratios to which the transmissions are adjusted. By providing the conical disks with teeth of small flank angles, the teeth on the segments of the chain are formed much more easily and the noise and heating of the gear elements are considerably reduced. Furthermore, the stability of the shape of the segmental teeth may be easily coordinated with the smaller flank angles of the teeth by making the faces of the teeth of a greater width than the bottom surfaces of the tooth gaps.

The features and advantages of the present invention will become more clearly apparent from the following detailed description thereof which is to be read with reference to the accompanying drawings, in which—

FIGURE 1 shows a view of the front surface of a toothed conical pulley disk according to the invention;

FIGURE 2 shows a longitudinal section of a pair of conical disks forming a pulley and of a chain therein;

FIGURE 3 shows the development of a cylindrical section which is taken along line A—A in FIGURE 1 and FIGURE 2; while FIGURE 4 shows a side view of a section of a chain.

Figure 5:
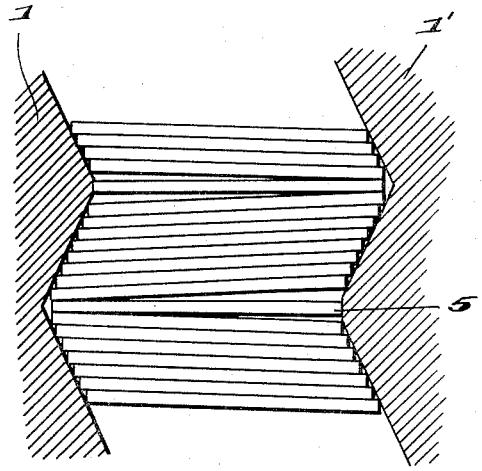
FIGURE 5 is a view similar to FIGURE 3 of a modification.

As illustrated in the drawings, the two conical pulley disks 1 and 1' of each pair are mounted in such a position relative to each other that each tooth space 2 of one disk lies directly opposite to a tooth 3 of the other disk, as seen in the axial direction of both disks. Between these conical disks a link chain 4 is inserted which is provided with segments 5 which are slidable transversely to the direction of travel of the chain. The angle at which the flanks 6 and 6' of the teeth 3 of disks 1 and 1' are disposed relative to the plane of the surface of these disks is indicated in FIGURE 3 at $\alpha$ and $\alpha'$, respectively, while the width of the face of each tooth is indicated at $a$ and the width of the bottom surface of each tooth space at $b$.

The development of the conical disks 1 and 1' as shown in FIGURE 3, clearly illustrates the function of the conical disk-and-chain drive insofar as it is affected by the inclination of the angles $\alpha$ and $\alpha'$ of the tooth flanks. If the angle $\alpha$, $\alpha'$ amounts to 0°, the transmission of power from the chain to disks 1 and 1' or vice versa can occur solely by friction. The other extreme angle of $\alpha$ and $\alpha'$ amounting to 90° is merely of theoretical interest since the segments of the chain links could then not engage with or disengage from the teeth of the conical disks without wedging. Proceeding from this theoretical angle of 90°, the best possible angle of the tooth flanks for attaining a positive transmission of forces was previously ascertained empirically to amount to about 60°. If, however, the angles $\alpha$ and $\alpha'$ of the tooth flanks are made less than 50°, as prescribed by the invention, and preferably amount to only 20° to 45°, the connection between the segmental chain and the toothed conical disks will no longer be purely positive.

In order to explain the function of such a conical disk-and-chain drive clearly, it may be assumed that chain 4 in FIGURE 3 forms the driving member and moves in the upward direction within the plane of the drawing, while the two conical disks 1 and 1' together form the driven member. When entering between the two disks 1 and 1', the moving chain 4 forms a tooth of a shape in accordance with the shape of teeth 3 of the disks. The segments 5 of one set then engage with their opposite ends upon the flanks 6 and 6' and the faces of the opposite teeth of disks 1 and 1' which are rotationally staggered relative to each other. In the particular embodiment of the invention as illustrated in FIGURE 3, the width $b$ of the tooth spaces 2 is also smaller than the width $a$ of the tooth faces. Purely for the purpose of illustrating the action of the forces, the segments 5 which engage with the tooth flanks are shown as being inclined. Actually, however, all of the segments lie flat on each other since together they form a tightly packed set. The difference between the widths $a$ and $b$ is also greatly enlarged in FIGURE 3 in order to explain the invention more clearly; actually, however, there are no gaps between the ends of the segments 5 and the bottom surfaces of the tooth spaces 2, as shown in FIGURE 3.

Under the action of the chain tension, that is, in the upward direction in FIGURE 3, and under the action of the wedging force which occurs in radial directions toward the axis of rotation of disks 1 and 1', frictional forces are produced on the tooth flanks, the tooth faces, and on the bottom surfaces of the tooth spaces, as well as clamping forces between the flat sides of the segments. If the size of the flank angles $\alpha$ and $\alpha'$ and the widths $a$ and $b$ of the tooth faces and tooth spaces are properly coordinated, the chain will—as the result of its tension—carry out a small creeping movement relative to the conical disks in the direction of its travel, which means that the tooth which is formed by the segments of each link slightly lags with respect to the movement of travel of the chain. If the angles $\alpha$ and $\alpha'$ and the widths $a$ and $b$ are made of suitable sizes and the chain is given a suitable tension, for example, by pressing the conical disks axially against the chain, the peripheral force to be transmitted will as the result of this creeping movement of the chain be distributed to numerous chain links and in an ideal case to all links which are in engagement with the conical disks. In spite of this creeping movement, the desired positive engagement between the teeth of the conical disks and the chain remains substantially unaffected and no slipping of the chain occurs.

A further improvement of this drive may be attained by making the flank angles $\alpha$ and $\alpha'$ of each tooth of the conical disks of different sizes. Which of these flank angles is to be made larger or smaller than the other depends upon whether it is the purpose of this difference to facilitate the engagement of the chain with the teeth of the conical disks of the particular pulley or to facilitate its disengagement from these teeth. This has merely the disadvantage that the direction of travel of the chain and the direction in which the power is to be transmitted are then fixed and that the driving and driven sides of the gear cannot be interchanged. In a similar manner it is possible to make the flank angles $\alpha$ and $\alpha'$ of the teeth of the conical disks on the driving side of the gear of a different size from those on the driven side in order to take into account the difference in the distribution of the peripheral force to the chain links which are in engagement with the teeth of the disk of the two sides of the gear.

The modification shown in FIG. 5 is similar to that of FIG. 3, except that the bottom surfaces $b$ of the tooth spaces are reduced to zero while the face $a$ is of small width. This operates in substantially the same manner that is described above.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. An infinitely variable cone pulley transmission having two pulleys, each comprising a pair of toothed conical disks, the teeth of which have a trapezoidal cross section and each tooth of one disk of each pair being disposed directly opposite to a tooth space of the other disk of said pair, as seen in the axial direction of both disks, and a link chain connecting said pulleys and having a plurality of links, each of said links comprising a plurality of segments slidable transversely to the direction of travel of said chain and adapted to form teeth of a changing width and pitch by their engagement with the opposite teeth and tooth spaces of each pair of conical disks, the flanks of said teeth of said disks being disposed relative to the roots of said teeth at an angle of less than 50°, the width of the face of each tooth of the conical disks being at least equal to the width of the bottom surface of each tooth space.

2. An infinitely variable cone pulley transmission having two pulleys each comprising a pair of toothed conical disks, the teeth of which have a trapezoidal cross section and each tooth of one disk of each pair being disposed directly opposite to a tooth space of the other disk of said pair, as seen in the axial direction of both disks, and a link chain connecting said pulleys and having a plurality of links, each of said links comprising a plurality of segments slidable transversely to the direction of travel of said chain and adapted to form teeth of a changing width and pitch by their engagement with the opposite teeth and tooth spaces of each pair of conical disks, the flanks of said teeth of said disks being disposed relative to the roots of said teeth at an angle of 20° to 45°, the width of the face of each tooth of the conical disks being at least equal to the width of the bottom surface of each tooth space.

3. A cone pulley transmission as defined in claim 1, in which the width of the face of each tooth of the conical disks is greater than the width of the bottom surface of each tooth space.

4. A cone pulley transmission as defined in claim 1, in which the face of each tooth has a certain small width and the bottom surface of the tooth space has a width of substantially zero.

5. A cone pulley transmission as defined in claim 1, in which the flanks of each tooth of the conical disks are disposed at different angles.

6. A cone pulley gear as defined in claim 1, in which the flank angles of the teeth of the pair of conical disks forming the driving pulley differ in size from the flank angles of the teeth of the pair of conical disks forming the driven pulley.

References Cited by the Examiner

UNITED STATES PATENTS

| | | | |
|---|---|---|---|
| 1,601,662 | 9/26 | Abbott | 74—231 |
| 1,601,663 | 9/26 | Abbott | 74—236 |

DON A. WAITE, *Primary Examiner.*

MILTON KAUFMAN, *Examiner.*